Jan. 1, 1935.  J. L. MAUTHE ET AL  1,986,736
GAS WASHER
Filed April 9, 1934   3 Sheets-Sheet 1
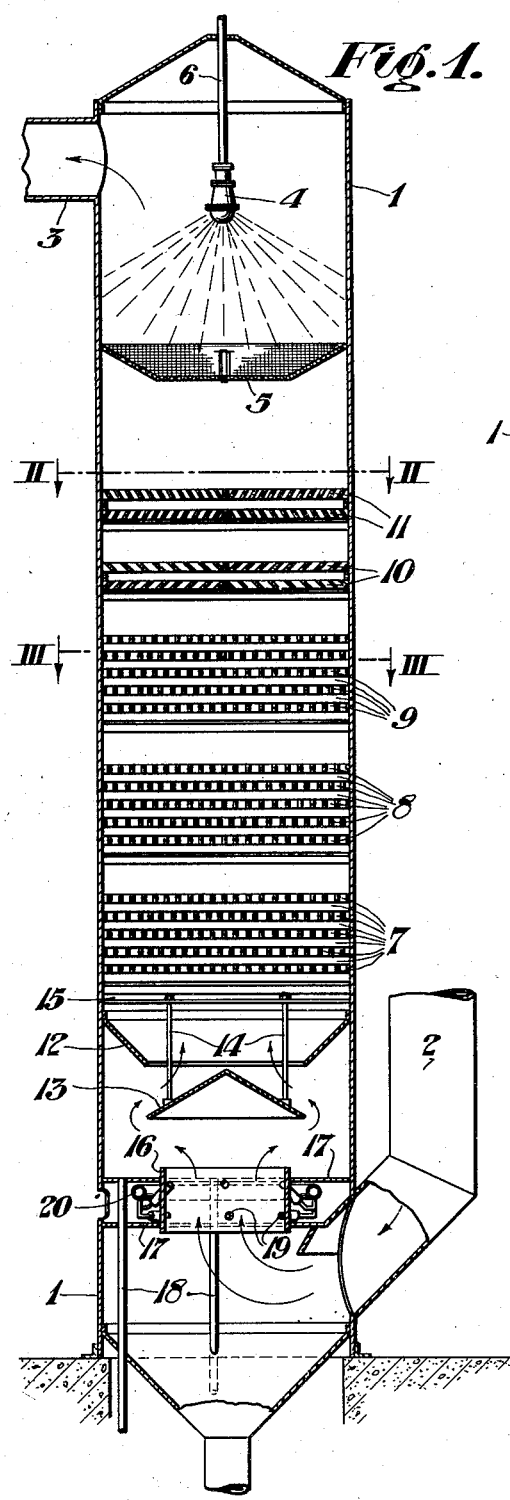
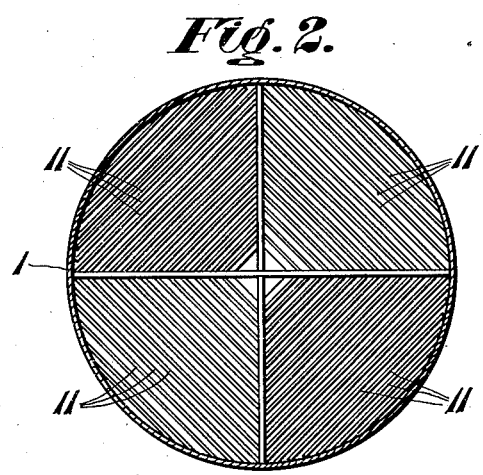
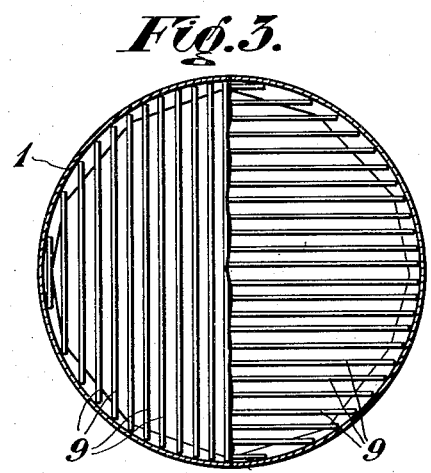
*Inventors:*
JAMES L. MAUTHE and
EDMUND G. PRICE.
by
*their Attorneys.*

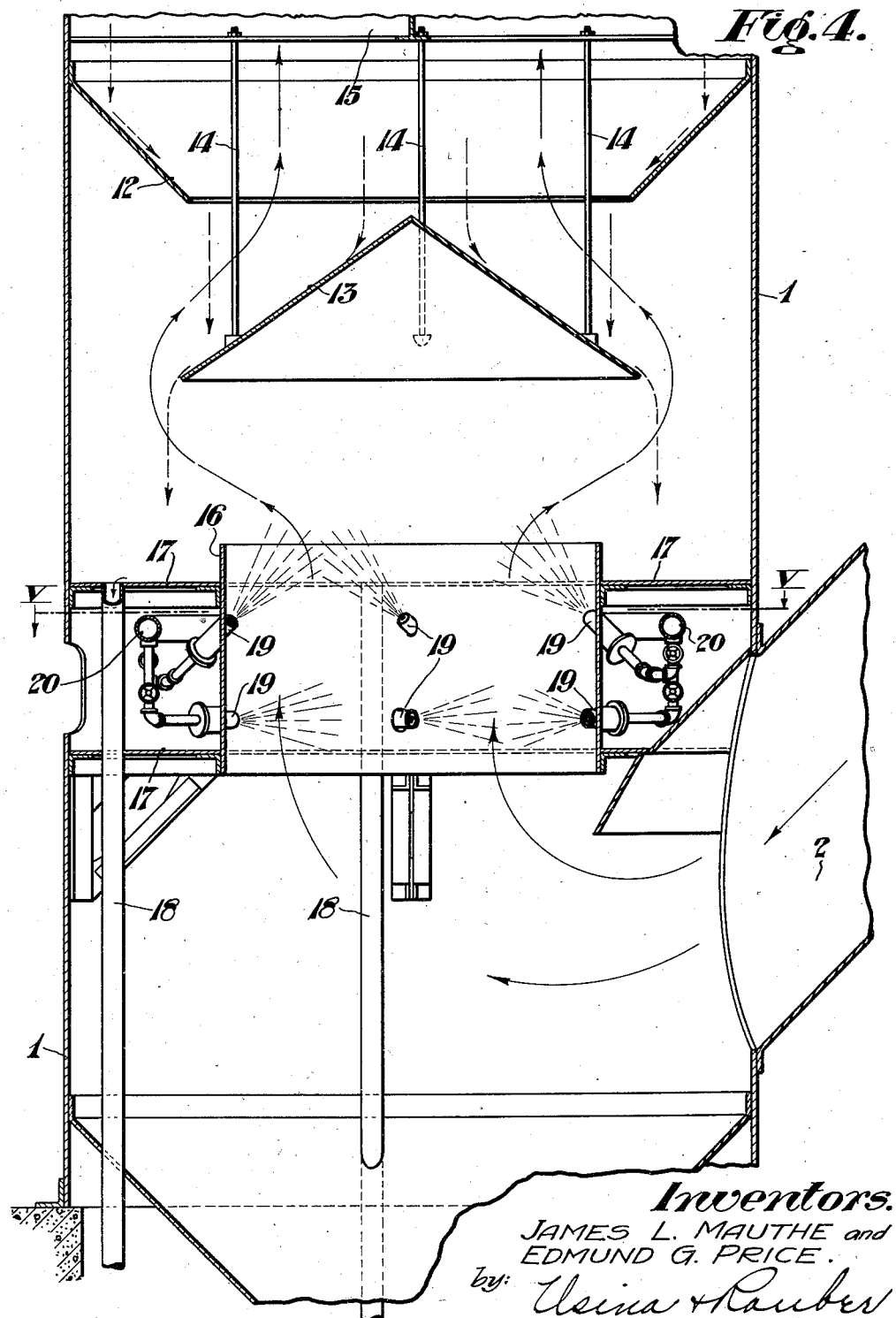

Jan. 1, 1935. J. L. MAUTHE ET AL 1,986,736
GAS WASHER
Filed April 9, 1934  3 Sheets-Sheet 3

Inventors:
JAMES L. MAUTHE and
EDMUND G. PRICE.
by Usina & Rauber
their Attorneys.

Patented Jan. 1, 1935

1,986,736

UNITED STATES PATENT OFFICE 1,986,736

GAS WASHER

James L. Mauthe, Elyria, and Edmund G. Price, Lorain, Ohio

Application April 9, 1934, Serial No. 719,790

4 Claims. (Cl. 261—111)

This invention relates to gas washers or scrubbers such as are used in blast-furnace gas cleaning plants, one of the objects being to provide a general increase in their dust removal efficiency. Other objects may be inferred.

Referring to the accompanying drawings:

Figure 1 is a section of a washer constructed according to the present invention.

Figures 2 and 3 are cross-sections taken from the lines II—II and III—III in Figure 1.

Figure 4 is an enlargement from Figure 1.

Figure 5:
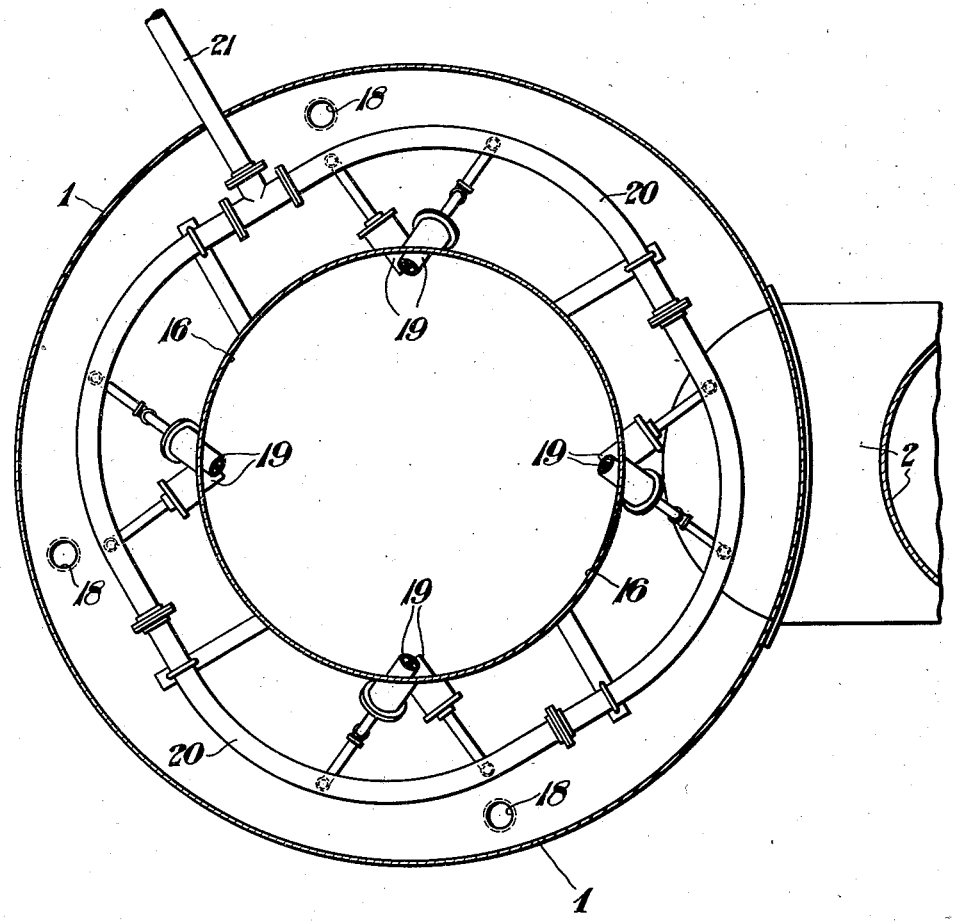
Figure 5 is a cross-section from the line V—V in Figure 4.

The gas washer illustrated by the above drawings includes a vertical casing 1 having an inlet 2 at it lower end and an outlet 3 at its upper end. A spray-head 4 is arranged in the upper end of the casing 1 so as to shower water down through a screen 5. This spray-head is mounted by a pipe 6 which also functions to supply it with water, and the screen 5 is constructed to convert the resulting spray into a downward shower of water which completely fills the casing 1. Gases entering the inlet 2 rise through the casing 1 in a direction opposite to that of the falling shower, and finally exit through the outlet 3.

To insure intimate comingling of the gases and water, three stages of vertical baffles 7, 8 and 9, and two stages of slanting baffles 10 and 11, are arranged in the casing 1 below the head 4 and screen 5. All of the baffles may be made from wood boards, those forming the vertical ones being alternately arranged in different directions to produce a checkerboard effect, and those forming the slanting ones being alternately arranged to angle in opposite directions so that tortuous paths are provided. The various surfaces provided by these baffles are kept thoroughly wetted by the falling shower of water so that they effect a scrubbing of the rising gases.

A downwardly arranged frusto-conical skirt 12 is arranged beneath the above described baffles for the purpose of collecting falling water which might be close to the inside of the casing 1, so that the shower becomes somewhat concentrated. An upwardly directed cone 13 is suspended below the skirt 12 by means of bars 14 which connect with the mounting 15 of the lowermost stage of baffles 7. This cone is of a size larger than the opening in the skirt 12, and deflects the solid concentrated shower falling therethrough, into an annular shower.

Directly under the cone 13 is a vertically arranged open-ended drum 16, horizontal walls 17 closing the space between this drum and the inside of the casing 1. This drum is of a size smaller than the cone 13 so that the annular shower formed by this cone must fall in the space between the drum and the inside of the casing. One horizontal wall 17 confines the water so that its descent through the casing is stopped. A portion of the water discharges through outlets 18, the remainder spills over the upper edge of the open-ended drum 16.

The drum 16 mounts a plurality of inwardly directed spray nozzles 19 at spaced positions in two levels, those in the lower level being horizontally arranged to point in similar tangential directions, and those in the upper level being arranged at upward angles to point in similar tangential directions which are opposite to the directions those in the lower level point. These nozzles all connect to a header pipe 20 which is supplied with water by a pipe 21.

Because of the arrangement of the nozzles 19 they provide a means for providing a spray of fluid through which the gases entering the casing 1 by way of the inlet 2 must pass. Further, the effect of these nozzles is to produce oppositely whirling sprays with the upper one directed upwardly, and the drum 16 functions to guide the gases through these two whirling sprays. These nozzles should be constructed to produce a fine or atomized spray.

A further feature of the invention is that it includes a new method of washing gases. This method consists in providing the nozzles 19 with hot water or steam, and the spray-head 4 with relatively cool water. The gases being cleaned are usually hot.

Due to the heat of these gases and the use of the hot water, a maximum quantity of the spray water is converted to vapor. The gases and this vapor then pass through the conical shower created by the cone 13, which condenses the major part of the vapor from the gases.

Since the vapor resulting from the spray water is very finely divided and widely distributed, it is very effective in accumulating the extremely fine particles of dust which cannot be removed in the ordinary washer. The use of hot water has the additional advantage of being more easily atomized when first passing through the nozzles 19 due, it is believed, to a decrease in the surface tension.

Arrows on the drawings show the paths of the gases so well that a specific description is unnecessary.

Although a specific example of the invention is shown and described in accordance with the patent statutes, it is not intended to limit the scope of the invention exactly thereto, except as defined in the following claims.

We claim:

1. A gas washer including a vertical casing with an inlet at its lower end and an outlet at its upper end, means in the upper end of said casing for producing a falling shower of fluid, baffles in said casing below said means, a vertically arranged open-ended drum in said casing between said baffles and said inlet, a wall closing the space between said drum and the inside of said casing, and a plurality of inwardly directed spray nozzles projecting through said drum at spaced positions.

2. A gas washer including a vertical casing with an inlet at its lower end and an outlet at its upper end, means in the upper end of said casing for producing a falling shower of fluid, baffles in said casing below said means, a vertically arranged open-ended drum in said casing between said baffles and said inlet, a wall closing the space between said drum and the inside of said casing, and a plurality of inwardly directed spray nozzles projecting through said drum at spaced positions in two levels, those in the lower level being horizontally arranged to point in similar tangential directions and those in the upper level being arranged at upward angles to point in similar tangential directions which are opposite to the directions those in the lower level point.

3. A gas washer including a vertical casing having an inlet at its lower end and an outlet at its upper end, means in the upper end of said casing for producing a falling shower of fluid, baffles in said casing below said means, a downwardly arranged frusto-conical skirt below said baffles, an upwardly directed cone below said skirt and of a size larger than the opening in the latter, a vertically arranged open-ended drum beneath said cone, and of a size smaller than the latter, a wall closing the space between said drum and the inside of said casing, and a plurality of inwardly directed nozzles projecting through said drum at spaced positions.

4. A gas washer including a vertical casing having an inlet at its lower end and an outlet at its upper end, means in the upper end of said casing for producing a falling shower of fluid, baffles in said casing below said means, a downwardly arranged frusto-conical skirt below said baffles, an upwardly directed cone below said skirt and of a size larger than the opening in the latter, a vertically arranged open-ended drum beneath said cone and of a size smaller than the latter, a wall closing the space between said drum and the inside of said casing, and a plurality of inwardly directed nozzles projecting through said drum at spaced positions in two levels, those in the lower level being horizontally arranged to point in similar tangential directions and those in the upper level being arranged at upward angles to point in similar tangential directions which are opposite to the directions those in the lower level point.

JAMES L. MAUTHE.
EDMUND G. PRICE.